United States Patent [19]

Gjertsen et al.

[11] Patent Number: 4,725,401
[45] Date of Patent: Feb. 16, 1988

[54] ELEMENT IMMERSED IN COOLANT OF NUCLEAR REACTOR

[75] Inventors: Robert K. Gjertsen, Monroeville; John F. Wilson, Murrysville, both of Pa.

[73] Assignee: Westinghouse Electric Corp., Pittsburgh, Pa.

[21] Appl. No.: 865,933

[22] Filed: May 16, 1986

Related U.S. Application Data

[63] Continuation of Ser. No. 570,551, Jan. 13, 1984.

[51] Int. Cl.⁴ .......................... G21C 7/26; G21C 3/30
[52] U.S. Cl. ..................................... 376/327; 376/426
[58] Field of Search .............. 376/426, 429, 327, 420, 376/412

[56] References Cited

U.S. PATENT DOCUMENTS 3,085,954 4/1963 Stohr et al. ........................ 376/426
3,192,621 7/1965 Bauer et al. ..................... 376/426 X
4,432,934 2/1984 Gjertsen et al. ................ 376/209 X

FOREIGN PATENT DOCUMENTS 1244632 9/1960 France ............................... 376/426

Primary Examiner—John F. Terapane
Assistant Examiner—John S. Maples
Attorney, Agent, or Firm—H. Diamond

[57] ABSTRACT

A coolant-displacement rod for a nuclear reactor including a stack of zirconium-oxide pellets in cladding of ZIRCALOY-4 alloy. The outer surfaces of certain of the pellets spaced at intervals along the stack are depressed. The cladding grows permanently when exposed to neutron flux but the zirconium oxide is dimensionally stable. Under the hoop stress impressed by the coolant on the cladding, the part of the cladding encircling each of the pellets with the depressed outer surface engages the outer surface compartmentalizing the pellets into sub-stacks. The formation of a long unsupported gap under the cladding which might collapse under the pressure and at the temperature coolant is prevented by forming a plurality of short unsupported gaps instead of one long gap.

16 Claims, 5 Drawing Figures

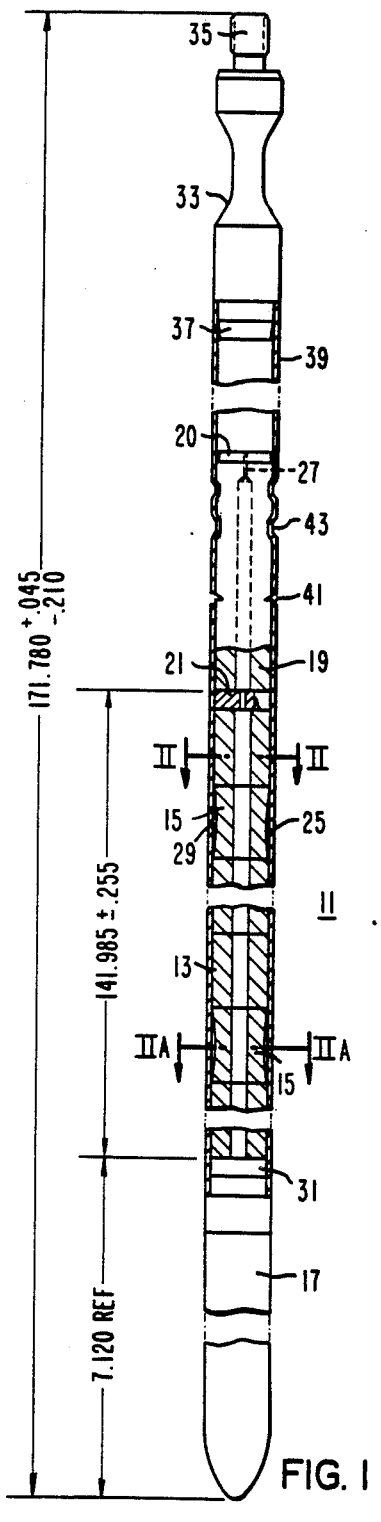
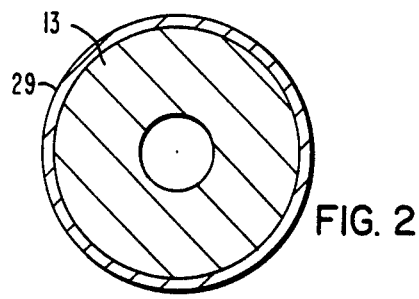
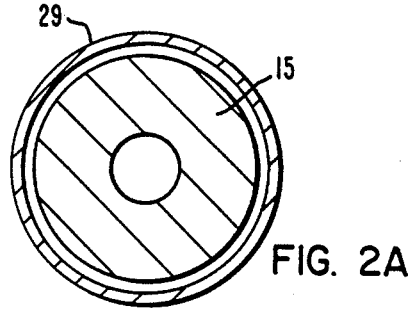
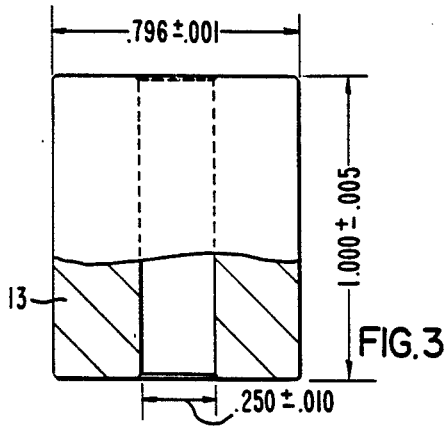
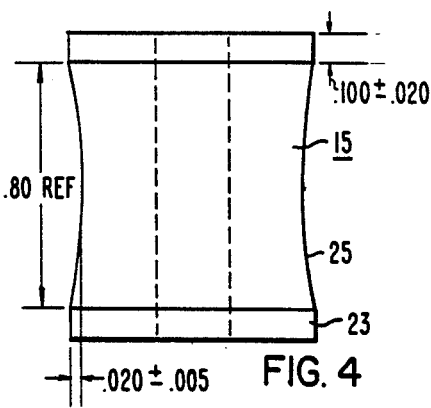

ELEMENT IMMERSED IN COOLANT OF NUCLEAR REACTOR

This application is a continuation of application Ser. No. 570,551, filed Jan. 13, 1984.

CROSS-REFERENCE TO RELATED APPLICATIONS

Application Ser. No. 490,099, filed Apr. 29, 1983 to Luciano Veronesi et al. for "Nuclear Reactor", now abandoned, application Ser. No. 570,487, filed Jan. 13, 1984 to Ablert Weiss for "Element Immersed in Coolant of Nuclear Reactor" now U.S. Pat. No. 4,606,109, dated Aug. 19, 1986, and U.S. Pat. No. 4,432,934, granted Feb. 21, 1984 to Robert K. Gjertsen et al. for "Displacer Rod for Use in a Mechanical SpectralShift Reactor All", assigned to Westinghouse Electric Corporation, are incorporated herein by reference.

BACKGROUND OF THE INVENTION

This invention relates to nuclear reactors and it has particular relationship to the elements of a nuclear reactor which are immersed in the coolant of a nuclear reactor. Among such elements are fuel elements and control elements of fuel assemblies. In addition, as disclosed in the above-identified Veronesi et al. application, and other related applications, there are coolant-displacement rods. Coolant-displacement rods are immersed in the coolant of a nuclear reactor when the nuclear reactor plant is started up and at the beginning of each refueling cycle (typically 18 months). They reduce the moderation of the neutron flux which would be produced by the coolant by displacing the coolant. After the reactor has been in operation for some time (typically 10 months of each cycle), these coolant-displacement rods are withdrawn from the coolant.

The nuclear reactor elements each includes a stack of pellets enclosed in cladding. A fuel element includes a stack of pellets of fissionable or fertile materials, such as uranium, plutonium or thorium or certain of their compounds enclosed in cladding. The cladding may be a zirconium alloy or stainless steel. A control element includes pellets of a neutron absorbing material, such as natural boron or boron 10 or their compounds, enclosed in cladding. A coolant-displacement rod, which is herein also categorized under the heading "element", includes zirconium-oxide pellets enclosed in cladding of a zirconium alloy.

In the interest of dealing in concrete concepts, this invention is described in detail herein as applied to coolant-displacement rods. To the extent that this invention is applicable to elements of other types, such application is within the scope of equivalents of this invention. Coolant-displacement rods are used predominantly in nuclear reactors of the pressurized-water type. This invention is not confined to pressurized-water reactors and to the extent that it or its principles are embodied in reactors of other types, such embodiment is within the scope of equivalents of this invention.

It has been found that when a coolant-displacement rod is exposed to high energy neutron-flux, the cladding of zirconium alloy grows axially while the zirconium oxide remains dimensionally stable. This growth of the cladding is permanent and progressive. The cladding does not retract axially when the rod is removed from the flux environment, as happens for thermal expansion, and the growth increases as the exposure to the flux progresses. The life of a reactor is about 40 years. Over this time interval, an unsupported gap of as much as 7 inches may be developed in the pellet stack usually at the upper end of the rod. At the temperature, pressure and flux of the coolant in the reactor, cladding at the unsupported gap would collapse. Distortion of collapsed cladding would cause jamming of a rod in its guide tube or thimble, not only restricting the axial movement of the rod with the collapsed cladding, but also restricting the movement of the whole associated coolant-displacement-rod assembly. Typically there are 24 rods in an assembly. Restriction of the movement of these rods would materially deteriorate the operation of the reactor.

It is an object of this invention to prevent the formation, in a coolant-displacement rod of a nuclear reactor, of an excessively long unsupported gap, which might collapse in the environment of the coolant of the reactor as a result of the growth of the cladding when exposed to neutron flux and to provide such a rod in which the length of any unsupported gaps formed shall be minimized. A more general object of this invention is to provide a clad element which is immersed in the coolant of a nuclear reactor in which the lengths of unsupported gaps formed under the cladding as a result of the exposure of the element to neutron flux shall be minimized.

SUMMARY OF THE INVENTION

In accordance with this invention the formation of a long unsupported gap in the stack of an element immersed in the coolant of a nuclear reactor is precluded by subdividing the stack into a plurality of sub-stacks each having an unsupported sub-gap of permissible length. In the practice of this invention, there is provided such an element in which certain of the pellets, at predetermined intervals along the stack, have a shape such as to subdivide the stack into separate sub-stack compartments. These subdividing pellets have a smaller transverse cross-sectional area, at least over a portion of their lengths, than the remainder of the pellets. Specifically, the element is a coolant-displacement rod, the pellets are composed of zirconium oxide and the cladding of a zirconium alloy. Typically, the pellets are cylindrical and the smaller or reduced transverse-cross-sectional pellets have an "hourglass" profile. When an element in accordance with this invention is placed in a core; i.e., is immersed in the coolant of the reactor, the combination of external pressure on the surface of the cladding, temperature and higher-energy flux causes the zirconium cladding to creep down over the outside surface of the pellets of reduced transverse cross-sectional area. The stack of pellets in the element is compartmentalized into a plurality of spans or sub-stacks, each bounded by subdividing pellets of reduced transverse cross-sectional area. The accumulation into one long gap of the gaps from sub-stack to sub-stack or compartment to compartment or span to span is prevented because the subdividing pellets defining a sub-stack are rendered immoveable with respect to the cladding by the part of the cladding which encircles them.

The spacing of the compartmentalizing pellets is governed by the maximum length of an unsupported gap which will resist buckling. This length is determined by derivation of a relationship which predicts the collapse or buckling of the cladding as a function of the unsupported length of the gap. This relationship may be derived by conventional strength-of-material computation given the thickness of the cladding, its modulus of elasticity, its elastic limit and other properties. In a sense cladding over an unsupported gap is analogous to a beam supported at both ends. Such beams are treated at length in elementary texts on strength of materials.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 1 is a view in side elevation, partly in section, showing a coolant-displacement rod in accordance with this invention;

FIG. 2 is a view in transverse section taken along line II—II of FIG. 1;

FIG. 2A is a view in transverse section taken along line IIA—IIA of FIG. 1;

FIG. 3 is a view in side elevation, partly in section, showing a standard pellet of the rod shown in FIG. 1; and FIG. 4 is a view in side elevation of a compartmentalizing pellet of the rod shown in FIG. 1.

FIGS. 1, 3 and 4 include typical dimensions of a coolant-displacement rod in accordance with this invention for a pressurized-water reactor. These dimensions are included, not for the purpose of restricting the scope of this invention in any way, but to aid those skilled in the art in the practice of this invention.

DESCRIPTION OF THE PREFERRED EMBODIMENTS

The drawings show a coolant-displacement rod 11. The rod 11 includes a stack of pellets 13 and 15 interposed between a tapered end plug 17 and a mid plug 19. The mid plug 19 terminates in a chamfer 20 at its inner end. The rod 11 is immersed in the coolant with the end plug 17 downwardly. The expression "outer end" means the end towards the end plug 17, "inner end" means the end away from this end plug.

A spacer 21 is interposed between innermost pellet 13 of the stack and the mid plug 19. The pellets 13 (FIG. 3) are standard pellets. They are of hollow circularly cylindrical form. The pellets 15 are compartmentalizing pellets. Each pellet 15 (FIG. 4) has the profile of a hollow "hourglass" terminating at each end in thin disc-like cylinders 23 joined by a slightly depressed surface 25 which in longitudinal cross-section has the form of a circular arc. The radius of the arc is high compared to the length of the pellet so that the diameter of the waist differs by only a small magnitude from the diameter of the ends 23.

The end plug 17 is solid. The mid plug 19 is in the form of a hollow circular cylinder terminating at its inner end in a central hole 27 of small diameter.

The pellets are enclosed in cladding 29 which extends from a stem 31 at the inner end of the end plug 17 to a position along the mid plug 19. The end plug 17, the mid plug 19, the spacer 21 and the cladding 29 are composed of an alloy whose composition is predominantly zirconium. A typical such alloy is ZIRCALOY-4 which has the typical composition presented in the following table.

| Element | Wt. %, min. | Wt. %, max. |
|---|---|---|
| Tin | 1.20 | 1.70 |

-continued

| | | |
|---|---|---|
| Iron | 0.18 | 0.24 |
| Chromium | 0.07 | 0.13 |
| Iron + Chromium | 0.28 | |
| Oxygen | 0.09 | 0.16 |
| Zirconium | Balance | |

| Element, ppm maximum | | | | | |
|---|---|---|---|---|---|
| Aluminum | 75 | Copper | 50 | Nitrogen | 80 |
| Boron | 0.5 | Hafnium | 100 | Silicon | 120 |
| Cadmium | 0.5 | Hydrogen | 25 | Titanium | 50 |
| Carbon | 270 | Lead | 130 | Tungsten | 100 |
| Chlorine | 20 | Manganese | 50 | Uranium, total | 3.5 |
| Cobalt | 20 | Nickel | 70 | Uranium-235 | 0.025 |

The elements in the lower part of the table are impurities.

At its outer end, the cladding 29 is welded pressure tight to the shoulder of the end plug 17 formed by the stem 31. At its inner end, the cladding is welded pressure tight to the surface of the mid plug 19. When the welding is completed, the air is exhausted through hole 27 from the space enclosed by the cladding and the space is back-filled with an inert gas such as helium at about atmospheric pressure. The hole 27 is sealed pressure tight by a weld. Reaction of components of air such as oxygen and water vapor with the ZIRCALOY alloy is thus precluded.

At the end opposite the end 17 the rod 11 includes a plug extension 33 terminating in a threaded tip 35. The tip 35 serves to connect the rod 11 to the rod drive (not shown). The rod extension 33 has a stem 37 defining a shoulder. A tube 39 extends between this shoulder, to which it is welded, and the mid plug 19 and abuts the weld 41 between the cladding 29 and the mid plug 19. The tube 39 is secured to the mid plug 19 by circular swaged joints 43. The plug extension 33 and the tube 39 are composed of stainless steel. The tube 39 is vented.

The rod 11 is immersed in the coolant with the tapered end 17 downwardly. The taper facilitates the entry of the rod into the thimble which receives the rod. The whole rod including the tube 39 is bathed by the coolant. Since the tube 39 is vented, the coolant penetrates into the tube and there is no differential in pressure across the tube wall. Typically, the pressure of the coolant is about 2250 pounds per square inch. The temperature of the coolant while the reactor is in operation is about 600° F. There is substantial pressure against the cladding 29. The thermal expansion of the pellets 13 and 15, the cladding 29 and the tube 39 is reversible. The axial expansion of the cladding which results from the neutron flux is permanent. As the cladding 29 expands, it is urged by the hoop stress exerted by the coolant into engagement with the depressions 25 in the pellets 15 (FIG. 4) compartmentalizing the pellets in the stack into substacks each bounded by a pair of pellets 15.

In the rod 11 shown in the drawings, every tenth pellet is a compartmentalizing pellet 15. Since each pellet is one inch in length, the length of a compartmentalized sub-stack is 10 inches. The length of the pellet stack of the typical rod shown in the drawings is 141.985±0.255 inches, less the length of the spacer which is about ¼", and may be taken to be 142 inches. Over an interval of 40 years, the axial expansion of the cladding 29 would, in the absence of the compartmentalized sub-stacks, result in an unsupported gap of about 7 inches. The gap resulting for each sub-stack in a compartmentalized stack would then be:

$$\frac{10}{142} \times 7 \text{ inches}$$

or .49 inches

Computations on buckling of the cladding over one unsupported gap, based on this rod 11 with typical dimensions as shown in the drawings, establish that buckling of cladding will not occur under the coolant pressure and at the temperature of a PWR nuclear reactor for a gap of ½ inch or less. For rods of other dimensions; e.g., cladding of different thicknesses or different materials, the interval between compartmentalizing pellets 15 may be set to accommodate the permissible length of the unsupported gaps.

While preferred embodiments of this invention have been disclosed herein, many modifications thereof are feasible. This invention is not to be restricted except insofar as is necessitated by the spirit of the prior art.

We claim:

1. The method of preventing the deformation of an element of a nuclear reactor including a stack of pellets in cladding, said element being in use in said reactor immersed in the coolant of said reactor and being subjected to the neutron flux during operation of said reactor, said deformation being caused by the permanent expansion of said cladding as a result of impingement of said flux on said cladding; the said method comprising; disposing along said stack, at spaced intervals, compartmentalizing pellets with depressed outer surfaces with conventional pellets interposed between successive compartmentalizing pellets whose surfaces are not depressed; during operation of said reactor, subdividing said stack of pellets into sub-stacks which are mechanically isolated from each other by causing said cladding to creep over and engage, said compartmentalizing pellets as said cladding expands axially under the pressure and neutron flux and at the elevated temperature of said coolant, each sub-stack including a number substantially greater than one of conventional pellets bounded by successive compartmentalizing pellets, and dimensioning the length of each spaced interval between compartmentalizing pellets so that the length of each said sub-stack is such that the expansion, over the life of the reactor of the cladding covering the sub-stack, produces a sub-gap in said length which is so short as to preclude buckling by the pressure and at the temperature of said reactor when in use.

2. The method of preventing the deformation of an element of a nuclear reactor, including a stack of pellets in cladding, said element being in use in said reactor immersed in the coolant of said reactor and being subjected to the neutron flux during operation of said reactor, said deformation being caused by the permanent expansion of said cladding as a result of impingement of said flux on said cladding; the said method comprising: disposing along said stack at spaced intervals compartmentalizing pellets with depressed outer surfaces with conventional pellets interposed between successive compartmentalizing pellets with the outer surfaces of said conventional pellets not depressed, and with the inner surface of the cladding spaced from the depressed surface of each said compartmentalizing pellet, during operation of said reactor over a time interval of substantial duration, subdividing said stack of pellets into sub-stacks which are mechanically isolated from each other by causing said cladding to creep over and engage said depressed surface of said each said compartmentalizing pellet as said cladding expands axially under the pressure and neutron flux and at the elevated temperature of said coolant, each sub-stack including a number substantially greater than one of conventional pellets bounded by successive compartmentalizing pellets, and dimensioning the length of each spaced interval between compartmentalizing pellets so that the length of each said sub-stack is such that the expansion, of the cladding extending over the sub-stack, over the life of the reactor, produces a sub-gap in said length which is so short as to preclude buckling by the pressure and at the temperature of said reactor when in use during said interval.

3. An element to be immersed in the coolant of a nuclear reactor, said coolant being under substantial pressure, the said element including a stack of pellets enclosed in cladding, said cladding being composed of a material which expands permanently when exposed to neutron flux and said pellets being composed of a material which remains substantially dimensionally stable when exposed to neutron flux, said stack including conventional pellets and, compartmentalizing pellets, each of said compartmentalizing pellets having a profile wherein each of said compartmentalizing pellets are of smaller transverse cross-sectional area at least over a portion of the length of said each compartmentalizing pellet than the conventional pellets said compartmentalizing pellets to be engaged by the cladding as said cladding expands in the neutron flux, said compartmentalizing pellets being disposed at intervals along said stack with a number substantial greater than one of conventional pellets interposed between successive compartmentalizing pellets, whereby when said compartmentalizing pellets are engaged by cladding as the result of the permanent expansion of said cladding, said stack is subdivided into sub-stacks, each sub-stack being bounded at its ends by a pair of said compartmentalizing pellets, and forming with one of the bounding compartmentalizing pellets a sub-stack unit whose cladding is separately expandable, the length of each said unit being such that the gap produced by the expansion under neutron flux of the segment of cladding along said length of said each unit resists deformation under the pressure of the coolant, whereby the formation of a gap, under said cladding, of substantial length free of pellets, such as to deform under the pressure of said coolant, is precluded.

4. A coolant-displacement rod as the element of claim 3 wherein the pellets of the stack are composed of zirconium oxide and the cladding is composed of an alloy predominantly of zirconium.

5. The element of claim 3 wherein the height of each pellet is small compared to the height of the stack of pellets.

6. A coolant-displacement rod for a nuclear reactor, said rod to be immersed in the coolant of said reactor, said coolant being under substantial pressure, said coolant-displacement rod including a stack of pellets composed of zirconium oxide enclosed within cladding composed of an alloy predominantly of zirconium, certain of said pellets at intervals along said stack having a profile wherein each of said certain pellets are of smaller transverse cross-sectional area at least over a portion of the lengths of said each certain pellet than the other than said certain pellets such as to be engaged by the cladding as it expands in the neutron flux and thereby to subdivide said stack into sub-stacks, each sub-stack being bounded at its ends by a pair of said certain pellets and including a number substantially greater than one of said other pellets, said cladding securing said sub-stacks into units whose cladding is separately expandable, each said unit having a length such that the gap produced in said unit by the expansion under neutron flux of the segment of cladding along said length is so short as to resist deformation under the pressure and at the temperature of the coolant, whereby the formation of a gap, under said cladding, of substantial length, free of pellets such as to deform under the pressure of said coolant, is prevented.

7. An element to be immersed in the coolant of a nuclear reactor, said coolant being at an elevated temperature and under substantial pressure, the said element including a stack of pellets enclosed in cladding, said cladding being composed of a material which expands permanently when exposed to neutron flux and said pellets being composed of a material which remains substantially dimensionally stable when exposed to neutron flux; the said stack including a plurality of compartmentalizing pellets, at least a portion of the outer surface of each of said compartmentalizing pellets being depressed, and said stack also including a plurality of pellets wherein called normal pellets, the surfaces of said normal pellets being not depressed, a number substantially greater than one of normal pellets being interposed between each compartmentalizing pellet and the nearest compartmentalizing pellet or pellets to said each compartmentalizing pellet along said stack, whereby as a result of the permanent expansion of said cladding, when said element is immersed in coolant, the cladding creeps over the surface of each compartmentalized pellet under the pressure of the coolant and by reason of elevated temperature and neutron flux on the cladding and subdivides the said stack into compartmentalized sub-stacks, each sub-stack including a substantial number of normal pellets, each said substantial number being bounded by compartmentalized pellets, the spacing between each successive pair of compartmentalizing pellets along said stack being such that the maximum length of the unsupported gap of each sub-stack resulting from expansion of the cladding by reason of neutron flux precludes buckling.

8. The element of claim 7 wherein each normal pellet is circularly cylindrical and each compartmentalizing pellet has a smooth concave outer surface, said surface merging at its ends into circularly cylindrical surfaces of the same diameter as the normal pellets, said compartmentalizing pellets and said normal pellets being mounted longitudinally coaxial in said stack with the outer surface of said normal pellets flush with said circularly cylindrical surfaces.

9. The element of claim 7 wherein the each normal pellet is of annularly cylindrical shape, and the outer surface of each compartmentalizing pellet has the shape of a surface of revolution formed by rotating a plane curve including a circular arc merging at its end with short straight lines, about the longitudinal axis of said pellet, the short straight lines being spaced a distance from said axis which is substantially equal to the radius of each said normal pellets, the radius of the arc being high compared to the length of said compartmentalizing pellet.

10. The element of claim 1 wherein the height of each pellet is small compared to the height of the stack of pellets.

11. A coolant-displacement rod as the element of claim 7 wherein the pellets of the stack are composed of zirconium oxide and the cladding is composed of an alloy predominantly of zirconium.

12. The water-displacement rod of claim 11 wherein each normal pellet is circularly cylindrical and each compartmentalizing pellet has a smooth concave outer surface, said surface merging at its ends into circularly cylindrical surfaces of the same diameter as the normal pellets, said compartmentalizing pellets and said normal pellets being mounted longitudinally coaxial in said stack with the outer surface of said normal pellets flush with said circularly cylindrical surfaces.

13. The water displacement rod of claim 11 wherein each normal pellet is of circularly cylindrical shape, and a portion of the outer surface of each compartmentalizing pellet has the shape of a surface of revolution formed by rotating a plane curve including a circular arc merging at its end with short straight lines, about the longitudinal axis of said pellet, the short straight lines being spaced a distance from said axis which is substantially equal to the radius of each said normal pellets, the radius of the arc being high compared to the length of said compartmentalizing pellet.

14. The coolant-displacement rod of claim 2 wherein the cladding is composed of a ziconium alloy having substantially the following composition:

| Element | Wt. %, min. | Wt. %, max. |
| --- | --- | --- |
| Tin | 1.20 | 1.70 |
| Iron | 0.18 | 0.24 |
| Chromium | 0.07 | 0.13 |
| Iron + Chromium | 0.28 | |
| Oxygen | 0.09 | 0.16 |
| Zirconium | Balance | |

15. An element, when in use to be immersed in the coolant of a nuclear reactor, said coolant being under substantial pressure, said element including a stack of pellets enclosed in cladding, said cladding being composed of a material which expands permanently when exposed to neutron flux and said pellets being composed of a material which remains substantially dimensionally stable when exposed to neutron flux, said stack including conventional pellets and, compartmentalizing pellets, each of said compartmentalizing pellets having a profile wherein each of said compartmentalizing pellets are of smaller transverse cross-sectional area at least over a portion of the length of said each compartmentalizing pellet than the conventional pellets such that, in the element as produced and prior to the immersion of said element in said coolant of said nuclear reactor in use, the outer surface of said each compartmentalizing pellet is spaced from the inner surface of said cladding and when in use over a time interval of substantial duration said outer surface is engaged by the cladding as said cladding expands in the neutron flux, said compartmentalizing pellets being disposed at intervals along said stack with a number substantially greater than one of conventional pellets interposed between successive compartmentalizing pellets, whereby when said compartmentalizing pellets are engaged by cladding as the result of the permanent expansion or said cladding when said element is in use over said time interval, said stack is subdivided into sub-stacks, each sub-stack being bounded at its ends by a pair of said compartmentalizing pellets and forming with one of the bounding compartmentalizing pellets a sub-stack unit whose cladding is separately expandable, the length of each said unit being such that the gap produced by the expansion under neutron flux of the segment of cladding along said length of said each unit resists deformation under the pressure of the coolant, whereby the formation of a gap, under said cladding, of substantial length free of pellets, such as to deform under the pressure of said coolant, is precluded.

16. An element, when in use to be immersed in the coolant of a nuclear reactor, said coolant being at an elevated temperature and under substantial pressure, the said element including a stack of pellets enclosed in cladding, said cladding being composed of a material which expands permanently when exposed to neutron flux and said pellets being composed of a material which remains substantially dimensionally stable when exposed to neutron flux; the said stack including a plurality of compartmentalizing pellets, at least a portion of the outer surface of each of said compartmentalizing pellets being depressed, and said stack also including a plurality of pellets wherein called normal pellets, the surfaces of said normal pellets being not depressed, a number substantially greater than one of normal pellets being interposed between each compartmentalizing pellet and the nearest compartmentalizing pellet or pellets to said each compartmentalizing pellet along said stack, said depressed surface of each said compartmentalizing element being spaced from the inner surface of said cladding in said element as produced prior to the immersion of said element in said coolant in use, whereby as a result of the permanent expansion of said cladding when said element is in use in said nuclear reactor immersed in said coolant, over a time interval of substantial duration, said cladding creeps over the surface of each compartmentalized pellet under the pressure of the coolant and by reason of elevated temperature and neutron flux on the cladding and said depressed surface of said each said compartmentalizing pellet is engaged by said cladding and the said stack is subdivided into compartmentalized sub-stacks, each sub-stack including a substantial number of normal pellets, each said substantial number being bounded by compartmentalized pellets, the spacing between each successive pair of compartmentalizing pellets along said stack being such that the maximum length of the unsupported gap of each sub-stack resulting from expansion of the cladding by reason of neutron flux precludes buckling.

* * * * *